United States Patent [19]
Edwards et al.

[11] Patent Number: 5,751,875
[45] Date of Patent: May 12, 1998

[54] OPTICAL FIBER FERRULE

[75] Inventors: Bryan Thomas Edwards, Camp Hill; David Donald Erdman, Hummelstown; Robert L. Mansberger, II, Middletown; John Nicholas Skitka, Hummelstown; Michael Charles Sponsel, New Oxford, all of Pa.

[73] Assignee: The Whitaker Corporation, Wilmington, Del.

[21] Appl. No.: 727,844

[22] Filed: Oct. 4, 1996

[51] Int. Cl.[6] .................................................. G02B 6/36
[52] U.S. Cl. ........................... 385/84; 385/86; 385/76
[58] Field of Search ............................ 385/85, 84, 81, 385/86, 76, 62, 60, 78

[56] References Cited

U.S. PATENT DOCUMENTS

| | | | |
|---|---|---|---|
| 4,737,011 | 4/1988 | Iri et al. | 350/96.2 |
| 4,804,244 | 2/1989 | Hasegawa et al. | 350/96.2 |
| 4,887,875 | 12/1989 | Chang et al. | 350/96.21 |
| 4,925,266 | 5/1990 | Huebscher et al. | 350/96.2 |
| 5,071,218 | 12/1991 | Nishimoto | 385/60 |
| 5,085,492 | 2/1992 | Kelsoe et al. | 385/60 |
| 5,131,063 | 7/1992 | Monroe et al. | 385/78 |
| 5,151,961 | 9/1992 | Hvezda et al. | 385/60 |
| 5,208,887 | 5/1993 | Grinderslev | 385/81 |
| 5,216,734 | 6/1993 | Grinderslev | 385/60 |
| 5,341,447 | 8/1994 | Edwards et al. | 385/81 |
| 5,375,183 | 12/1994 | Edwards et al. | 385/60 |
| 5,381,500 | 1/1995 | Edwards et al. | 385/78 |
| 5,481,634 | 1/1996 | Anderson et al. | 385/76 |

*Primary Examiner*—Phan T. H. Palmer

[57] ABSTRACT

This invention is related to a fiber optic connector 10 including a precision ferrule 12 that is mounted in a machined tubular housing 40. An overmolded collar 70 secures the ferrule 12 to the housing 40 without the use of adhesives. Protruding lobes 26 on the ferrule 12 are received in a housing counterbore section 46 and the collar body 72 is molded around these lobes 26 to secure the ferrule against translation and rotation. The overmolded collar body 72 also engages a knurled surface 52 on the exterior of the tubular housing 40. The overmolded version of this connector 10 can be used with an epoxyless optical fiber termination. A press fit connector 110 is also disclosed.

27 Claims, 5 Drawing Sheets

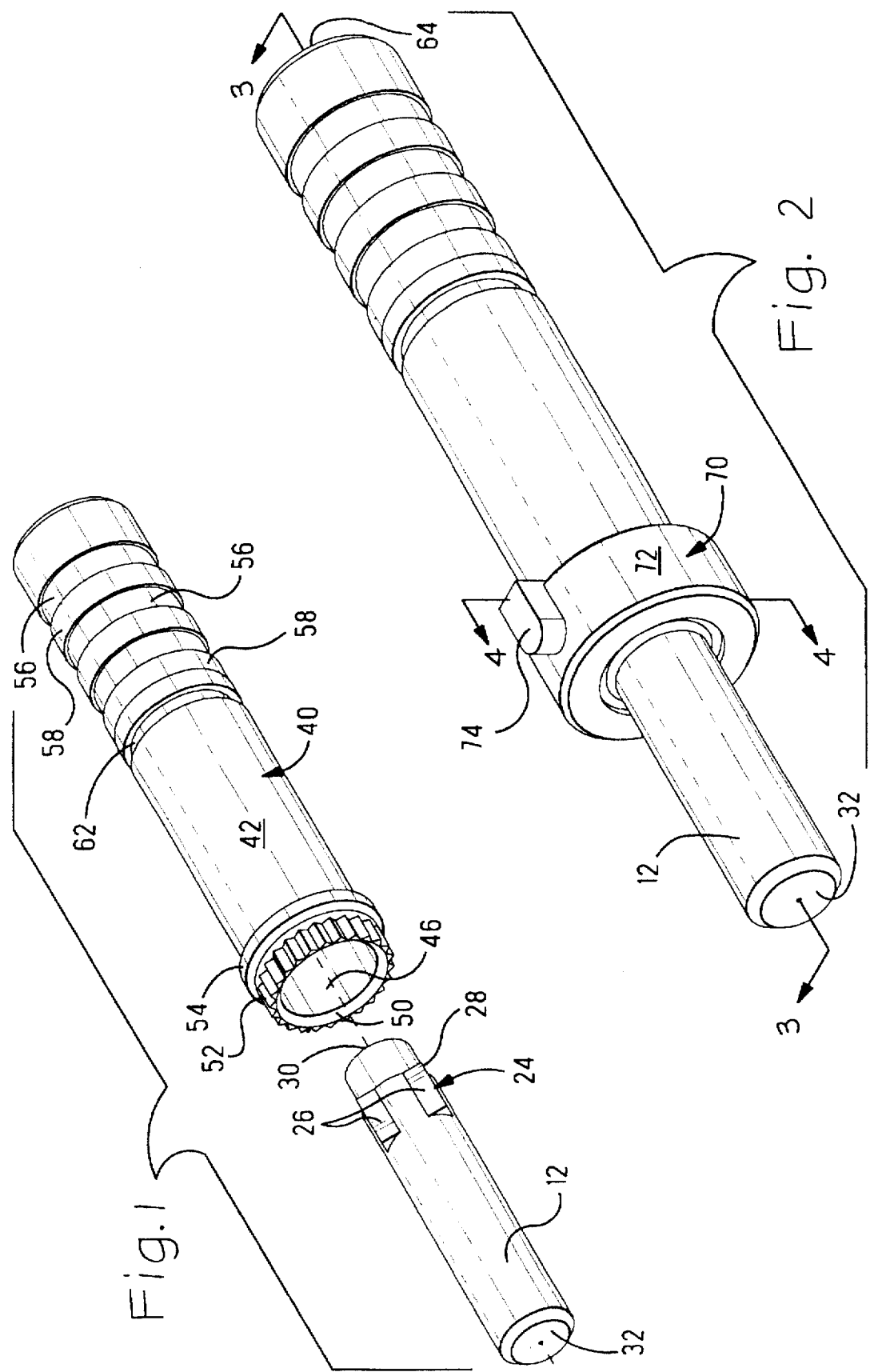

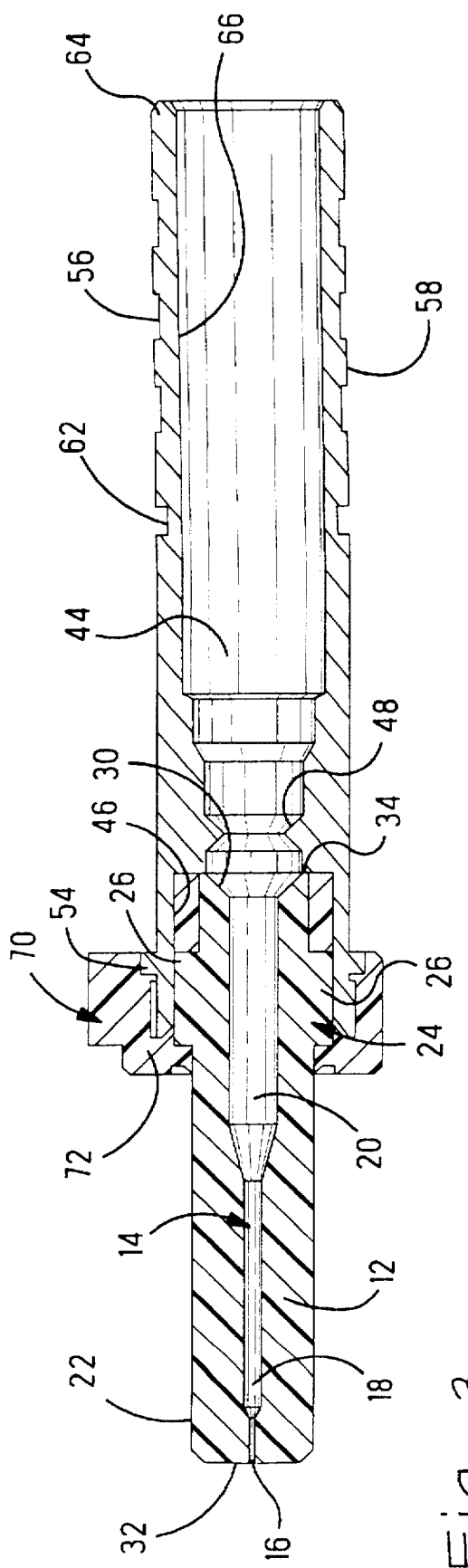
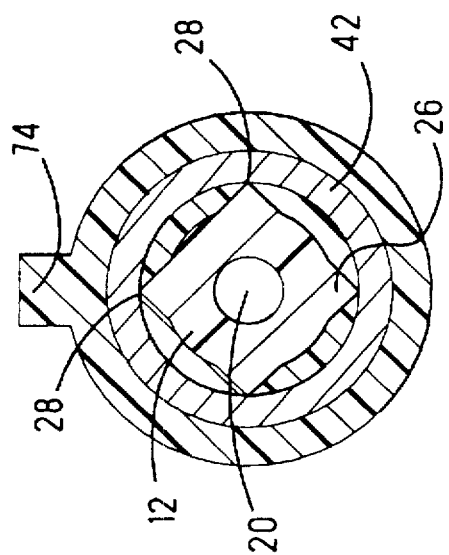
Fig. 3
Fig. 4

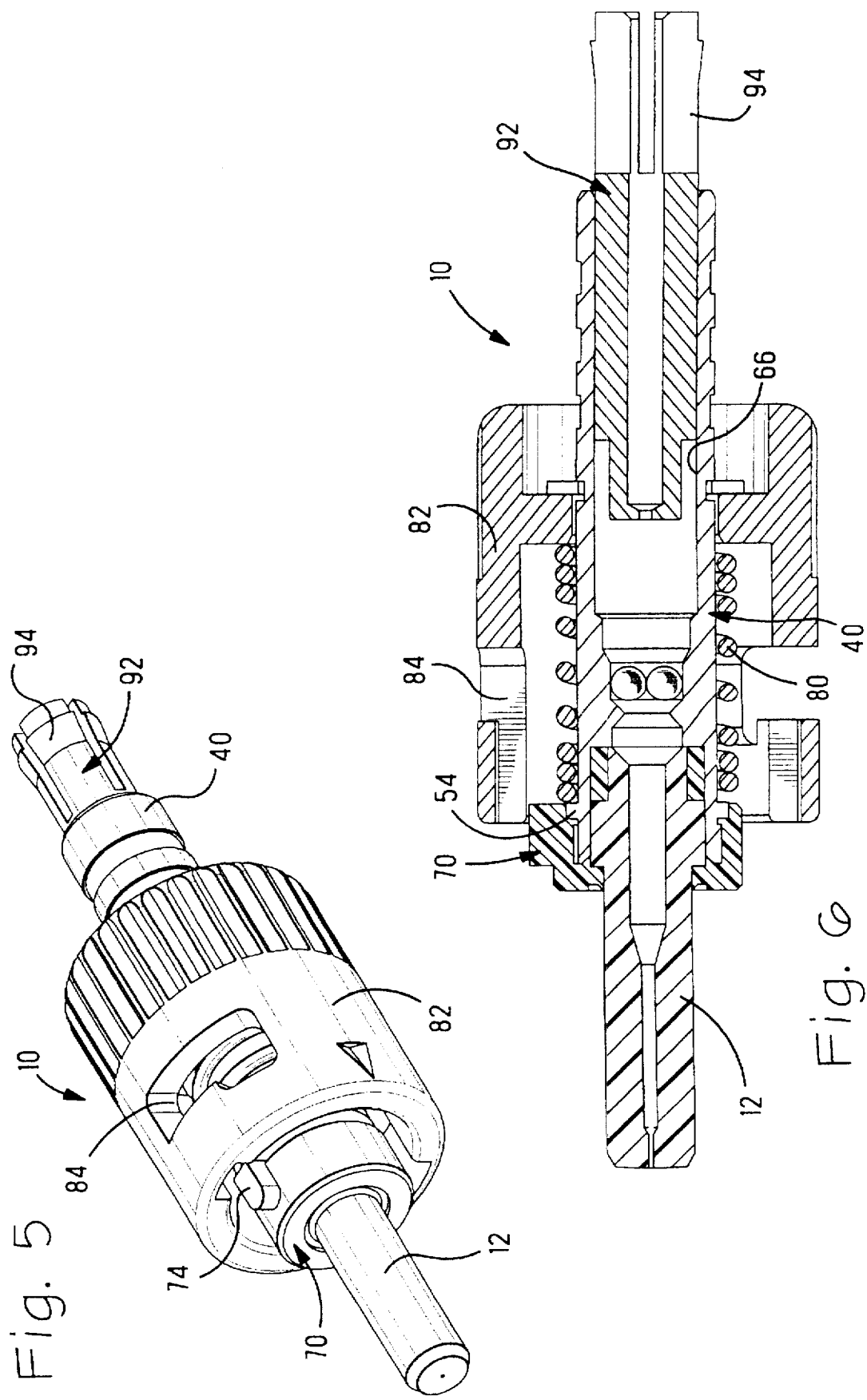

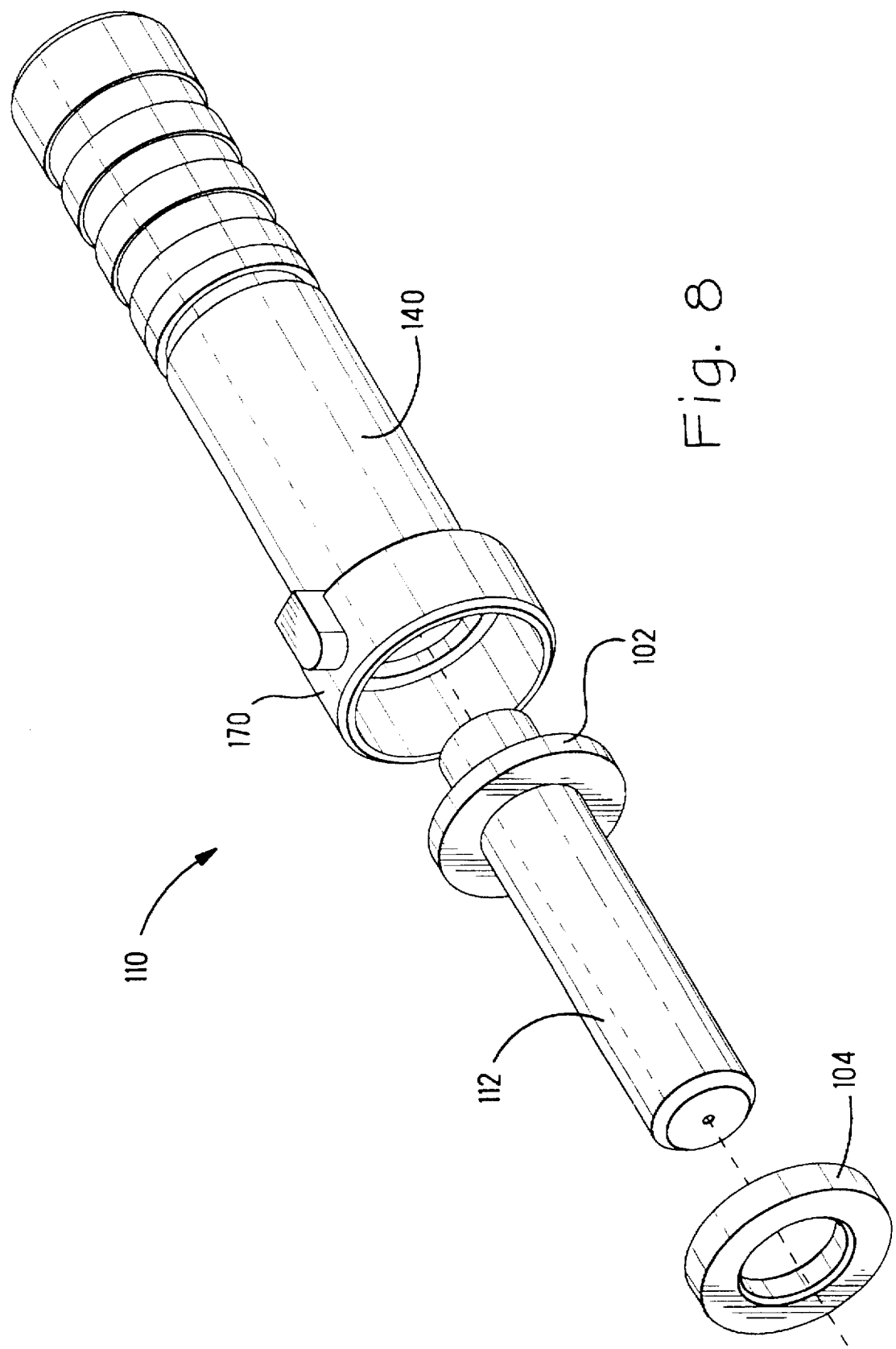

OPTICAL FIBER FERRULE

BACKGROUND OF THE INVENTION

1. Field of the Invention

This invention is directed to a fiber optic connector and is especially directed to fiber optic connectors that do not employ adhesives to position an optical fiber or to secure various connector subcomponents together.

2. Description of the Prior Art

Fiber optic communications cables typically include at least one light transmitting optical fiber clad in an optically insulating material. This cladding protects the glass or plastic fiber and prevents dispersion of light out of the optical fiber. The fiber optic cable usually has a protective external buffer, typically of a plastic material, which may or may not be removed to terminate the cable.

The use of fiber optic systems creates a need for a connector capable of coupling segments of light transmissive cable with minimal signal attenuation. To achieve efficient light transfer between fiber optic cables, the optical fibers must be axially and angularly aligned to high precision and must be placed in close proximity. The alignment and spacing requirements are quite demanding because of the small diameter of the fibers, typically measured in microns.

Both mechanical and adhesive clamping systems have been employed in fiber optic cables. Adhesives can be used to accurately position and secure optical fibers in a connector or similar component. However, one disadvantage of adhesive clamps is that they require proper application and curing of the adhesive. Not only does the use of adhesive clamps take time, but they can also be undesirably dependent upon operator skill.

One mechanical clamping system is disclosed in U.S. Pat. No. 5,208,887 where an axially telescoping actuating element is used in conjunction with compressive alignment members. One version of the connector disclosed therein employs a separate housing body and a precision ferrule that are preferably joined by press fitting, although adhesives and molding are mentioned as possible alternatives.

U.S. Pat. No. 5,375,183 discloses another connector in which a low precision body is overmolded over a high precision pre-formed precision alignment ferrule. Although that connector is intended for use in a variety of connector styles, including epoxyless and duplex connectors, the overmolded body is not considered suitable for use with a connector having the mechanical latching arrangement shown in U.S. Pat. No. 5,208,887 and the insert in U.S. Pat. No. 5,381,500.

The use of an adhesive to attach a precision ferrule to a connector body manufactured with less precision, and therefore less expensively, is a reliable and suitable manufacturing technique. This approach does however suffer from a number of disadvantages. First the adhesives themselves are subject to environmental deterioration. Secondly, adhesives can be messy to apply and are not suitable for use in a high volume, controlled manufacturing processes. The application of adhesives can require operator skill and can be quite messy. For example, conventional hot melt adhesives can leave trailers or stringers that must be removed in order to insure a product that at least has a satisfactory appearance.

SUMMARY OF THE INVENTION

This invention is directed to a fiber optic connector or similar component having a front ferrule for precisely positioning an optical fiber and a tubular housing in which the ferrule is coaxially received. A retainer positioned within the tubular housing bore engages a protruding section on the ferrule to secure the ferrule relative to the tubular housing. In one embodiment, this retainer comprises an overmolded collar that engages both the ferrule and the tubular housing. In another embodiment, the retainer comprises a press fit toroidal member that fits into the housing bore in front of a protruding ring on the ferrule. This invention is especially suitable for attaching a molded precision ferrule to a metal tubular housing used for clamping the fiber optic cable to the connector.

The ferrule is a generally cylindrical member and the protruding section can comprise multiple tapered lobes protruding from the cylindrical outer surface of the ferrule. The overmolded collar body extends between the angularly spaced lobes to prevent rotation of the ferrule in response to torsion. The overmolded collar also engages knurled surfaces on the exterior of the tubular housing to prevent rotation of the collar relative to the tubular housing.

For the overmolded version of this connector, the protruding ferrule section is positioned in a counterbore section of the tubular housing. One end of the ferrule engages a radially extending wall in the tubular housing to act as a barrier to prevent molten plastic from entering the ferrule and tubular housing bores.

In the press fit version of this invention a toroidal member is inserted into the tubular housing bore and forms a press fit. The toroidal press fit member engages a protruding ring on the ferrule to secure the ferrule in the housing bore.

A fiber optic connector in accordance with this invention can be reliably manufactured in a controlled process to produce a product having repeatable characteristics. The ferrule can be joined to the tubular housing without the use of adhesives to improve the manufacturing process.

This fiber optic connector can also be used with epoxyless connector versions such as the preferred embodiment. A mechanical latching means can be employed to secure the fiber optic cable to the connector without adhesives. This invention can be used to secure a molded precision ferrule to a metal housing to which the fiber optic cable is mechanically secured by a telescoping latching member that is press fit into the tubular member. This fiber optic connector can also be used in a standard bayonet configuration and the spring loading the bayonet sleeve can be supported by a shoulder on the metal housing so that excessive delaminating stresses are not exerted on plastic components.

The overmolded collar that secures the ferrule to the tubular housing can be molded in a standard configuration that can be mated to conventional connectors and an alignment key can be molded on the overmolded collar.

These and other objects and features can be achieved by representative embodiments of this invention described as follows.

BRIEF DESCRIPTION OF THE DRAWINGS

FIG. 1 is an exploded view of the precision ferrule and the housing of the fiber optic connector comprising the preferred embodiment of this invention.

FIG. 2 is a view of the preferred embodiment with an overmolded collar securing a precision ferrule to a tubular housing.

FIG. 3 is a side sectional view, taken along section lines 3—3 in FIG. 2, of a fiber optic connector employing an overmolded collar to secure a precision ferrule to a metallic tubular housing.

FIG. 4 is a cross sectional view, taken along section lines 4—4 in FIG. 2, with the ferrule partially positioned within the housing counterbore section and showing the collar and the radially protruding lobes on the front ferrule.

FIG. 5 is a perspective view of the fiber optic connector comprising the preferred embodiment of this invention showing a bayonet sleeve positioned on the housing with the front precision ferrule extending beyond the sleeve for connection to a mating bayonet style fiber optic connector.

FIG. 6 is a sectional view, taken along the section lines 6—6 in FIG. 5 showing the fiber optic connector with a spring loaded bayonet sleeve.

FIG. 8 is a view of an alternate embodiment in which a press fit retainer secures the precision ferrule to the housing.

DETAILED DESCRIPTION OF THE PREFERRED EMBODIMENTS

Figure 7:
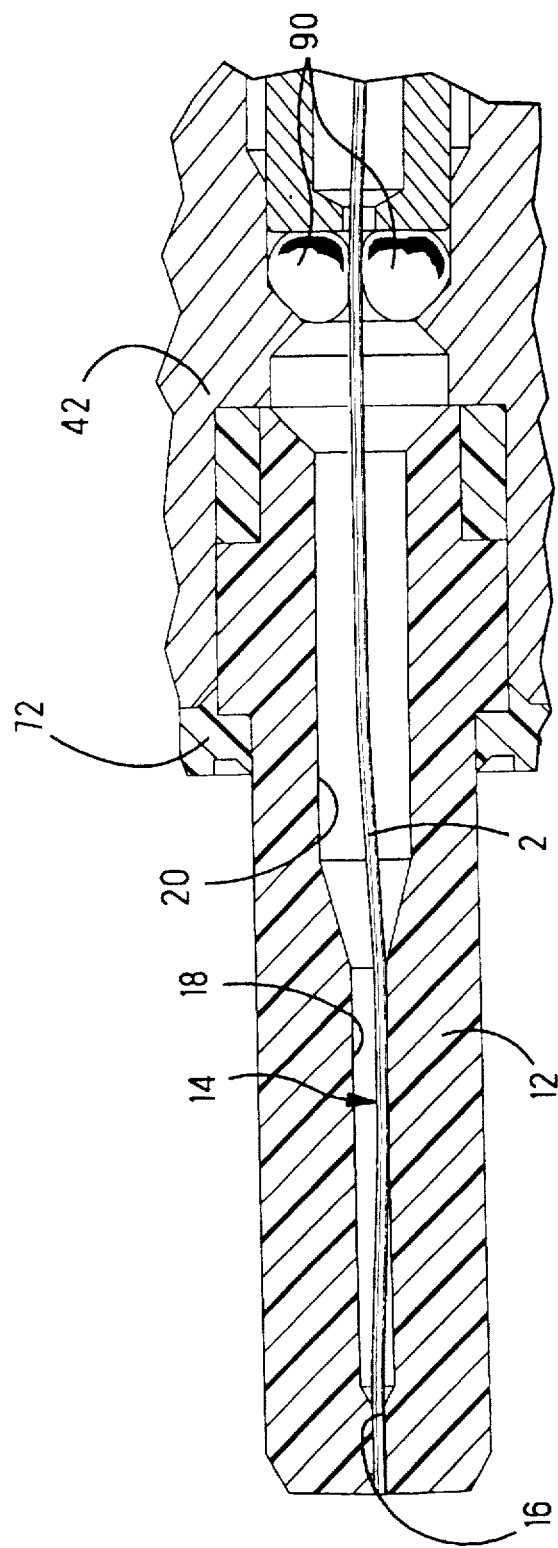
FIG. 7 is an enlarged view of the front ferrule bore showing the manner in which an optical fiber is supported.

Two representative embodiments of a fiber optic connector are depicted herein. The version shown in FIGS. 1–6 is an overmolded version in which an overmolded collar is employed to attach a precision ferrule 12 to a housing 40. FIG. 8 shows one alternate embodiment in which a ferrule and housing are secured by a press fit member.

The fiber optic connector 10 depicted herein is intended for use with a standard buffered fiber optic cable. The cable, not shown, is secured to the fiber optic connector in substantially the same manner as shown in U.S. Pat. No. 5,208,887. Detail differences between the connector 10 and the fiber optic connector shown in that patent will be discussed with reference to a more detailed discussion of the components forming fiber optic connector 10.

The preferred embodiment of this fiber optic connector 10 and the components forming this preferred embodiment are shown in FIGS. 1–6. The principal components of this connector are a front precision ferrule 12 that is secured to a rear tubular housing 40 by an retainer 70 comprising an overmolded plastic body 72 that engages surfaces on both the ferrule 12 and the housing 40. Fiber optic connector 10 also includes alignment spheres 90 and a plunger 92 that position and secure a fiber optic cable in much the same manner as that shown in U.S. Pat. No. 5,208,887. The preferred embodiment of this connector 10 is a bayonet style connection, and a spring 80 and coupling nut 82 are shown in FIGS. 5 and 6.

The front ferrule 12 and the housing 40 are shown in FIG. 1. Front ferrule 12 is a precision molded member that is used to precisely align the end of a fiber optic cable. Front or precision ferrule 12 can be molded from a material such as VECTRA, a liquid crystal polymer, supplied by Hoechst-Celanese of Chatham, N.J. Ferrule 12 is cylindrical and a cylindrical outer surface 22 extends from a front face 32 to a protruding section 24 located adjacent to the rear of the ferrule. In the preferred embodiment, the protruding section 24 includes four tapered lobes 26 that are angularly spaced around the circumference of the ferrule 12. Each lobe 26 is radially tapered and a longitudinal corner 28 is formed at the apex of each tapered lobe.

Additional details of the precision alignment ferrule 12 are shown in the cross sectional view of FIGS. 3 and 4. Ferrule 12 has a longitudinal precision bore 14 extending generally through the center of the cylindrical ferrule. Bore 14 tapers from a rear bore section 20 having a larger internal diameter to an intermediate bore section 18 having an intermediate diameter. A forward bore section 16 having a smaller diameter extends from intermediate bore section 18 to the forward ferrule face 32. The inner diameter of forward bore section 16 is only slightly larger than the outer diameter of an optical fiber with which the ferrule 12 is to be used. A typical inner diameter of forward bore section 16 is 127 micron. An optical fiber can thus be axially inserted through the rear face 30 of ferrule 12 and it will be progressively and more precisely aligned as it passes through the bore sections 20, 18, 16 with the end of the optical fiber eventually lying along the front face 32. For an epoxyless optical fiber termination, the intermediate bore section 18 serves an additional purpose. The transition between the rear bore section 20 and the smaller intermediate bore section 18 occurs approximately midway between the front and the rear of the ferrule 12. When an optical fiber 2 has been inserted through the bore, the distal end of the fiber will extend just beyond the front face 32. The optical fiber 2 will then be polished. During this polishing step, an axial compression load will be applied to the fiber 2 that, as will be discussed subsequently in greater detail, is gripped by tines 94 at the rear of the connector and is retained by retention spheres 90. The lateral deflection of the end loaded optical fiber section will be limited by engagement of the fiber 2 with the intermediate bore section at the midpoint between the ferrule front 32 and the retention spheres 90 or along other sections of the intermediate bore section 14. Because of the engagement of the fiber 2 with the intermediate bore section 14, which has a diameter less than the diameter of the rear bore section 20, the end loaded fiber section will follow a curvilinear path between the ferrule front 32 and the retention spheres 90 substantially reducing maximum lateral deflection. This curvilinear path is shown in FIG. 7. This end loaded fiber optic section can thus withstand greater compressive forces applied as the fiber is polished without damaging the optical fiber 2 or fracturing the fiber. This stepped bore configuration therefore not only allows the fiber 2 to be inserted endwise into the front ferrule and to be successively precisely aligned at the front of the ferrule, but it also prevents excessive lateral deflection of the fiber 2 thereby limiting the protrusion of the distal end when the load is removed. It is not necessary to position a full length supporting tubular sleeve around the bare optical fiber 2 to prevent excessive lateral deflection. A full length tubular support adds cost and complexity. The stepped bore configuration of the front ferrule 12 also lends itself to molding since the core pin that defines bore 14 will be thicker over a greater length and will therefore be stronger and more rigid.

The protruding lobes 26 are generally located in the rear portion of the ferrule 12 where larger bore section 20 is located. Lobes 26 are however spaced from the rear face 30 and a cylindrical sealing surface or lip 34 is formed at the rear of the ferrule. This lip 34 will serve to prevent plastic from flowing into the bore of the fiber optic connector in the manner to be subsequently discussed. It should be understood that the shape of the protruding section 24 could differ from that represented by the preferred embodiment. For example a pattern of offset pyramids or other configurations could also be employed.

The tubular housing 40 comprises the rear half of the tubular body subcomponent to be formed with the front precision ferrule 12. This tubular housing 40 can be machined from a metal, such as aluminum, to form a tubular or cylindrical body 42 and does not need to be constructed with the same precision as the front ferrule 12. Tubular housing 40 will therefore be less expensive to produce.

Tubular housing 40 has a bore 44 extending from a front face 50 to a rear face 64. Bore 44 has a counterbore section 46 located adjacent to the front face 50. Counterbore section 46 has a larger diameter than the remainder of the bore 44 and therefore has a thinner wall. A shoulder 48, countersunk from both ends forms a constriction in bore 44 adjacent the counterbore section 46. This countersunk section 48 forms the narrowest part of bore 44. Bore 44 is then stepped from shoulder 48 to a rear bore section 66 extending to the rear face 64 of housing 40. The thickness of this rear bore section 66 is sufficient to withstand forces necessary to firmly secure the fiber optic cable in the connector 10.

A ridged or knurled surface or contour 52 is formed on the exterior of the housing 40 immediately adjacent to the front face 50. This knurled surface extends completely around the housing 40 with grooves and ridges extending longitudinally parallel to the axis of the tubular housing 40 and the bore 44. Other ridged or protruding contours, such as raised bumps could be formed on the exterior of the front of the housing 44 and would serve the same purpose as the knurled surface 52. A radially protruding cylindrical shoulder or rib 54 is located adjacent to the rear edge of the knurled surface 52. This cylindrical shoulder 54 extends radially beyond the knurled surface 52 and will serve as a stop for a spring to be mounted on the housing 40. The exterior of the housing 40 between the shoulder 54 also includes a split or snap ring groove 62 and a series of cylindrical grooves 56 and lands 58 of conventional shape.

The front ferrule 12 is assembled to the housing 40 by first positioning the ferrule protruding section 24 in the housing counterbore section 46. The protruding corners 28 of lobes 26 engage the inner surface of counterbore section 46. In the preferred embodiment the lobes 26 are press fit against the inner diameter of the housing counterbore 46 to temporarily retain the ferrule 12 in the housing 40. The lobes 26 are however spaced from the rear face 30 of the front ferrule and a cylindrical sealing lip 34 extends from the lobes to the rear of the ferrule 12. The end of this sealing lip 34 corresponds to the ferrule rear face 30 and this end of the ferrule 12 engages the radially extending face at the base of the counterbore section 46. This abutting engagement acts as a seal to prevent molten plastic from entering the bores of either the ferrule 12 or the housing 40 during the overmolding step.

The collar 70 comprises an overmolded member 72 that mechanically secures the ferrule 12 to the housing 40 to prevent either translation or rotation of the ferrule 12 relative to the housing 40 when subjected to longitudinal or lateral forces or when subjected to bending or torsion. After the ferrule 12 is temporarily positioned in the tubular housing 40, the resulting subassembly is positioned within a mold having a cavity shaped to form the overmolded collar 70. A molten thermoplastic is then injected into the mold. A conventional thermoplastic such as VALOX, a thermoplastic polymer, supplied by General Electric Plastics of Pittsfield, Mass. can be employed. The molten plastic flows into the counterbore section 46 and surrounds the protruding ferrule lobes 26. The cylindrical sealing lip 34 acts as a barrier preventing plastic from entering the ferrule and housing bores. The overmolded collar body 72 also surrounds the exterior of the front of housing 40. In particular the overmolded body 72 surrounds the ridged or knurled surface 52 and the plastic enters the grooves formed in this knurled surface. When the plastic forming the overmolded body 72 solidifies the ferrule 12 is anchored to the housing 40. The overmolded body 72 surrounds lobes 26 in the front and back to prevent axial movement of the ferrule 12. The rigid overmolded body 72 also extends between the angularly spaced lobes 26. The overmolded body 72 cannot rotate relative to the housing because the knurled surface 52 is also engaged. Therefore the ferrule 12 cannot rotate relative to the collar 70 which in turn cannot rotate relative to the housing 40. In addition to acting as a mechanical anchor between the ferrule 12 and the housing 40, the collar 70 also has the same shape as the collar located on conventional fiber optic connectors of this type. A key 74 that prevents rotation between mating fiber optic connectors or devices is located on this collar and has a conventional shape so that this connector 10 can be mated with standard mating connectors or components.

Fiber optic connector 10 is a bayonet style connector. A coupling nut 82 surrounds the housing 40 and includes a slot for receiving a bayonet pin in a conventional manner. A spring 80 is located between the coupling nut 82 and the housing 40 to permit axial movement of the coupling nut 82 relative to the housing 40 to permit mating and unmating. A cylindrical rib 54 formed just behind the knurled surface 52 provides a stop for one end of spring 80. Since this rib 54 is an integral part of the metal housing 40, the spring force acts on the housing and not on the overmolded collar body 72 eliminating potential delamination of or damage to the collar 70. The coupling nut 82 is supported by a split ring that is snapped into a groove 62 on the exterior of the housing 40.

As previously mentioned, a fiber optic cable is positioned within the connector 10 in much the same manner as described in U.S. Pat. No. 5,208,887 incorporated herein by reference. The cable is first inserted through a plunger 92 located partially within the rear housing bore section 66. Retention spheres 90, located within the housing bore adjacent to the rear of the countersunk shoulder 48 align and retain the stripped optical fiber relative to the ferrule bore 14. The tapered sections of the precision ferrule bore 14 then align the end of the fiber with front bore section 16 as the optical fiber and the plunger 92 are telescoped into the connector bores. Tines 94 at the rear of the plunger 92 grip the fiber optic cable jacket as these tines engage the interior of the rear housing bore 66. The metal housing 40 has sufficient strength to withstand these latching forces or hoop stresses. By using a connector with this configuration, the fiber optic cable can be mounted in the connector without the use of adhesives in a manner that is not overly dependent upon operator skill. Furthermore the assembly of the components of the connector 10 does not require the use of adhesives making the assembly both more controllable and reliable, but also less subject to practical problems such as the mess created by the use of hot melt adhesives.

Although the overmolded version of this connector 10 is preferred because of the inherent reliability and repeatability of the molding process, other approaches consistent with the broader aspects of this invention can be employed. One such approach is represented by the press fit connector 110 shown in FIG. 8. Press fit connector 110 employs a molded ferrule 112 and a machined metal housing 140 that are similar to ferrule 12 and housing 40. The housing 140 differs from housing 40 in that the collar 170 is formed as part of the housing 140. Collar 170 has a smooth cylindrical bore. The ferrule 112 includes a cylindrical ring 102 protruding from the smooth cylindrical surface.

Ring 102 is located in substantially the same position as the protruding section 24 on ferrule 12. A toroidal press fit member 104 formed of a metal such as aluminum is dimensioned to fit within the bore of the collar 170 to form an interference or press fit. Press fit member 104 abuts the ring 102 to secure the ferrule 112 to the tubular housing 140.

The embodiment of FIG. 8 is not the only alternative embodiment within the scope of at least the broader aspects of this invention. Although the overmolded version of this invention may possess certain advantages that are not inherent in other versions, the two versions of this invention disclosed as representative are not the only possible alternatives. Modifications of individual features of these embodiments would also be apparent to one of ordinary skill in the art. For example the shape and number of protruding lobes could be altered. Different barriers preventing molten plastic from entering the housing and ferrule bores could also be employed. Furthermore, this invention could be employed on fiber optic connector of different styles. For example, this invention is not limited to use with a bayonet style fiber optic connector. Although this invention possess certain advantages when used with a metal tubular housing, other housings could be employed. This invention is also not limited to the use of an epoxyless connector using the plunger and retention spheres depicted herein. In addition, this invention could be used for fiber optic ports on components in addition to use in fiber optic connectors for splicing cables.

We claim:

1. A fiber optic connector comprising a front ferrule with a precision bore extending there through, for precisely positioning one end of a fiber optic cable, and a rear housing including an alignment bore for receiving a buffered fiber optic cable, the precision bore and the alignment bore being coaxial, the precision ferrule including a protruding section adjacent a rear face of the precision ferrule, the housing including an enlarged bore section adjacent a front face of the housing, the protruding section of the precision ferrule being received in the enlarged bore section on the housing, the fiber optic connector including a separate retainer engaging the housing and extending into the enlarged bore in front of the protruding section of the precision ferrule to secure the precision ferrule to the housing.

2. The fiber optic connector of claim 1 wherein the protruding section has a noncircular cross section.

3. The fiber optic connector of claim 2 wherein the precision ferrule has a cylindrical outer surface and the protruding section includes protruding corners extending beyond the cylindrical outer surface.

4. The fiber optic connector of claim 3 wherein the retainer extends between the protruding corners to prevent torsional forces from causing rotation of the precision ferrule relative to the housing.

5. The fiber optic connector of claim 4 wherein the retainer is molded in the enlarged bore section.

6. The fiber optic connector of claim 5 wherein the housing includes a retention surface extending from an outer surface of the housing adjacent to the front of the housing, the retainer being molded over the retention surface.

7. The fiber optic connector of claim 6 wherein the retention surface comprises a knurled surface.

8. The fiber optic connector of claim 1 wherein the housing comprises a metal body.

9. The fiber optic connector of claim 8 wherein the precision ferrule comprises a molded member.

10. The fiber optic connector of claim 9 including a spring and a spring loaded sleeve mounted on the housing.

11. The fiber optic connector of claim 1 wherein the retainer comprises an overmolded member.

12. The fiber optic connector of claim 1 wherein the retainer comprises a press fit member inserted into the front of the enlarged bore.

13. A fiber optic connector comprising a front ferrule having a bore for precisely positioning a fiber optic cable and a housing having a larger bore coaxial with the precision bore, the fiber optic connector including a separate overmolded collar securing the precision ferrule to the housing.

14. The fiber optic connector of claim 13 wherein the housing comprises a tubular body.

15. The fiber optic connector of claim 14 wherein the tubular body has a counterbore section adjacent to a front face thereof, with a rear end of the front ferrule being positioned within the counterbore, a rear face of the front ferrule abutting a radial surface formed by the counterbore section of the housing to form a seal preventing material forming the overmolded collar from entering the portion of the bore in the housing extending from the counterbore section to the rear of the housing.

16. The fiber optic connector of claim 15 wherein the housing includes a tapered shoulder to the rear of the counterbore, the connector including alignment members engaging the tapered shoulder to center the fiber optic cable.

17. The fiber optic connector of claim 16 further including a plunger received in the bore of the housing from the rear of the housing to secure the fiber optic cable in the housing.

18. The fiber optic connector of claim 13 wherein the ferrule includes a cylindrical outer surface with at least one radially protruding member extending from the cylindrical outer surface adjacent to a rear face of the front ferrule.

19. The fiber optic connector of claim 18 wherein a plurality of radially protruding members having a radially tapering cross section extend from the cylindrical outer surface at spaced angular positions.

20. The fiber optic connector of claim 19 wherein the overmolded collar extends between tapered protruding members within the larger bore of the housing.

21. The fiber optic connector of claim 13 wherein at least a portion of the front ferrule is positioned within a portion of the larger bore in housing.

22. The fiber optic connector of claim 21 wherein the overmolded collar extends around a front portion of the housing and around the portion of the front ferrule positioned in the larger bore of the housing.

23. The fiber optic connector of claim 13 wherein the housing includes a ridged outer surface adjacent the front of the housing, the overmolded collar engaging the ridged outer surface to secure the ferrule and the housing against relative movement.

24. The fiber optic connector of claim 23 wherein the ridged outer surface comprises a knurled surface.

25. A fiber optic connector comprising a front ferrule with a precision bore extending therethrough, for precisely positioning one end of an optical fiber in a fiber optic cable, a rear housing including an alignment bore for receiving a fiber optic cable and retention means for securing the fiber optic cable and the optical fiber in the fiber optic connector, the precision bore and the alignment bore being coaxial with the front ferrule being secured to the rear housing, the precision bore in the front ferrule including a rear bore section, an intermediate bore section and a front bore section, the rear bore section having an inner diameter greater then the inner diameter of the intermediate section, the intermediate bore section having an inner diameter greater than the front bore section, the inner diameter of the inner bore section being sufficient to precisely align the front of a single optical fiber, the length of the intermediate bore section being sufficient to limit lateral deflection of an optical fiber section positioned within the bore when the optical fiber section is subjected to end loads during polishing of the one end of the optical fiber to prevent fracture of the optical fiber due to lateral deflection.

26. The fiber optic connector of claim 25 wherein the length of intermediate bore section is approximately equal to one-half the length of the front ferrule.

27. The fiber optic connector of claim 26 wherein the inner diameter of the rear bore section is sufficient to capture the end of an optical fiber upon axial insertion of the optical fiber into the precision bore, the inner diameters of the intermediate bore section and the front bore section being sufficient to sequentially laterally align the fiber at front face of the front ferrule.

* * * * *